(12) United States Patent
Virshup et al.

(10) Patent No.: US 8,466,421 B2
(45) Date of Patent: Jun. 18, 2013

(54) RADIATION DETECTOR WITH MULTIPLE OPERATING SCHEMES

(75) Inventors: Gary Virshup, Cupertino, CA (US); Edward Seppi, Portola Valley, CA (US); James Clayton, San Jose, CA (US); Edward G Shapiro, Menlo Park, CA (US)

(73) Assignee: Varian Medical Systems Inc., Palo Alto, CA (US)

( * ) Notice: Subject to any disclaimer, the term of this patent is extended or adjusted under 35 U.S.C. 154(b) by 276 days.

(21) Appl. No.: 12/847,569

(22) Filed: Jul. 30, 2010

(65) Prior Publication Data

US 2012/0025084 A1 Feb. 2, 2012

(51) Int. Cl.
*G01T 1/20* (2006.01)

(52) U.S. Cl.
USPC .......................................... 250/367

(58) Field of Classification Search
USPC .......................................... 250/367
See application file for complete search history.

(56) References Cited

U.S. PATENT DOCUMENTS

| | | | | |
|---|---|---|---|---|
| 4,937,453 A | * | 6/1990 | Nelson ..................... | 250/370.09 |
| 2004/0251419 A1 | * | 12/2004 | Nelson et al. ............ | 250/370.09 |
| 2010/0096555 A1 | * | 4/2010 | Nelson ..................... | 250/363.04 |
| 2010/0270462 A1 | * | 10/2010 | Nelson et al. ............. | 250/252.1 |

* cited by examiner

*Primary Examiner* — Kiho Kim (57) ABSTRACT

A radiation detector includes a conversion element that converts an incoming radiation beam into electrical signals, which in turn can be used to generate data about the radiation beam. The conversion element may include, for example, a scintillator that converts the radiation beam into light, and a sensor that generates the signals in response to the light. The conversion element can be used in different schemes or data collection modes. For instance, the conversion element can be oriented normal to the radiation beam or transverse to the radiation beam. In either of these orientations, for example, the detector can be used in an integrating mode or in a counting mode.

7 Claims, 5 Drawing Sheets

RADIATION DETECTOR WITH MULTIPLE OPERATING SCHEMES

BACKGROUND

Radiation detectors can be used in a variety of different ways. For example, a truck's cargo can be inspected accurately and non-invasively by situating the truck's trailer between a radiation source and a radiation detector. In this manner, an inspection of the trailer's contents can be performed relatively quickly and conveniently because it is not necessary to unload the cargo in order to perform the inspection. Nevertheless, inspection speeds are still somewhat limited by the capabilities of contemporary radiation detectors. In other words, there continues to be a need to improve the speed at which accurate inspections can be conducted.

SUMMARY

Generally speaking, a radiation detector includes a conversion element that converts an incoming radiation beam into electrical signals, which can be used to generate data about the radiation beam, which in turn can be used to characterize an object being inspected (e.g., a truck's cargo). In one embodiment, the conversion element includes a scintillator that converts a radiation beam into light, and a sensor that generates electrical signals in response to the light. The detector can also include processing circuitry that processes the electrical signals to generate data about the radiation beam.

The scintillator may be a pixilated, multi-row array of individual scintillator elements, with multiple scintillator elements per row. The sensor also may be a pixilated, multi-row array such as an amorphous-silicon (a-Si) photodiode, thin-film-transistor (TFT) array. Thus, instead of a conventional linear detector having a single line of pixels (a 1×N pixel array) or a single row of scintillator material, multiple lines of individual sensor elements and multiple rows of individual scintillator elements are used. Accordingly, inspections can be performed with greater speed and accuracy.

Also, the detector can be used in different schemes (different data collection modes). For instance, the conversion element (e.g., the combination of scintillator and sensor) can be used in an orientation that is normal to or substantially normal to the radiation beam, or in an orientation that is transverse to or substantially transverse to the radiation beam, or in an orientation that is between those two extremes (e.g., at a 45-degree angle relative to the beam). In each of these orientations, the detector can be used in an integrating mode or in a counting mode. In the integrating mode, the energy absorbed by each pixel in the sensor array over a period of time can be determined—each pixel measurement is the result of the sum of many radiation events within an object voxel (a volume element in the object being inspected). In the counting mode, the number of x-ray photons detected by each pixel in the sensor over a period of time can be counted—each pixel measurement represents a single interaction between the radiation beam and an object voxel. In the transverse orientation, it is also possible to measure the energy spectrum of the radiation beam. Data about the radiation beam can be used to characterize the object being inspected. For example, in the integrating mode, the energy detected by each pixel can be used to create a two-dimensional radiograph of the object by determining the amount of energy absorbed by each object voxel.

These and other objects and advantages of the various embodiments of the invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Unless noted otherwise, the drawings are not to scale.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "using," "generating," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
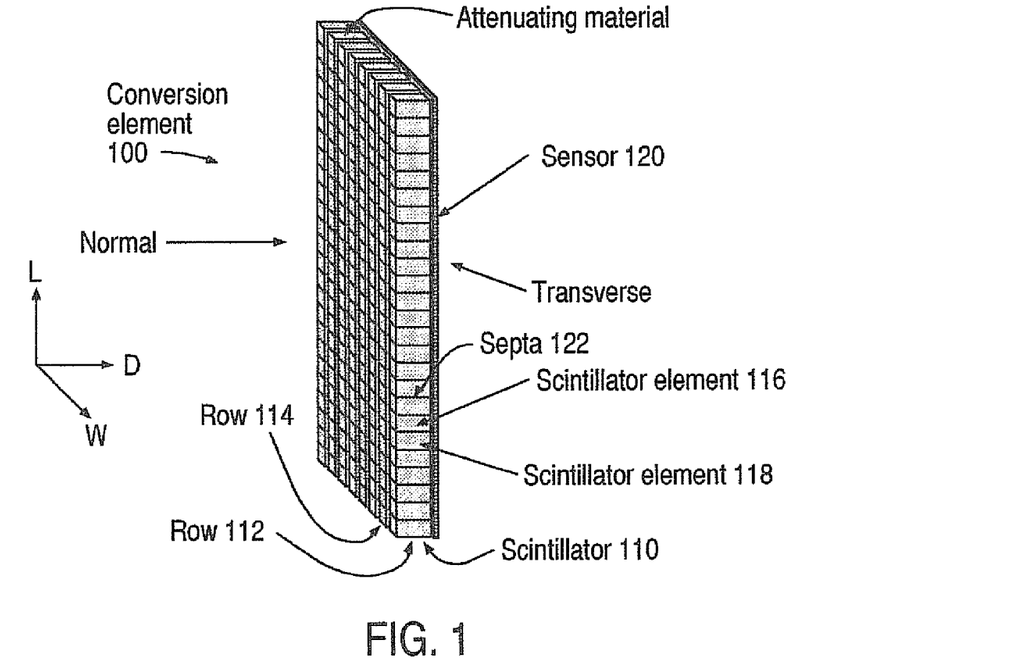
FIGS. 1, 2 and 3 illustrate elements of a radiation detector according to an embodiment of the invention.

FIG. 1 illustrates elements of a radiation detector according to an embodiment of the invention. In particular, FIG. 1 illustrates an embodiment of a conversion element 100 that can be used in a higher energy (mega-voltage or MV) radiation detector. In the example of FIG. 1, the conversion element 100 includes a scintillator 110 and a sensor 120.

In general, the scintillator 110 includes a scintillator material that can emit light photons in response to an incident radiation beam. In one embodiment, the radiation beam includes x-ray photons. In general, the radiation beam may include particulate radiation, such as electrons and heavy charged particles, or uncharged radiation, such as photons and neutrons. Furthermore, radiation detection may not be based just on transmission imaging, but can also include sensing scattered or secondary radiation, including photons or neutrons from events such as fission or possible natural or induced radiation.

In one embodiment, the scintillator material is cesium-iodide (CsI), although other light-emitting scintillator materials (e.g., cadmium tungstate ($CdWO_4$), bismuth germinate (BGO), lutetium yttrium orthosilicate (LYSO), and phosphor-based scintillators, e.g., $Gd_2O_2S$) may be used. Direct conversion materials or photoconductors (e.g., mercuric iodide, selenium, and lead iodide) can also be used. In one embodiment, the scintillator 110 includes multiple, parallel rows (e.g., row 112) of scintillator material. In one such embodiment, each row of scintillator material is separated from adjacent row(s) by a row 114 of attenuating material. The attenuating material may be a high-Z or high density material that is capable of attenuating a radiation beam, such as lead or tungsten.

In one embodiment, the scintillator 110 is pixilated. That is, each row 112 includes a number of individual scintillator elements (e.g., scintillator elements 116 and 118). In one such embodiment, the scintillator elements are separated from each other by a septa material 122 (which may be lead or tungsten). A scintillator element may also be referred to as a detector voxel.

In general, the sensor 120 (which may also be referred to as a sensor array or sensor panel) and the scintillator 110 are closely coupled so that the sensor 120 can receive the light photons emitted by the scintillator 110 and can convert the light photons into electrical signals. In one embodiment, the sensor 120 is an amorphous silicon (a-Si) photodiode, thin-film-transistor (TFT) array. In such an embodiment, the a-Si substrate is pixilated—that is, the substrate is divided into a number of separate pixel elements that are separated from each other. As such, a light photon produced by a scintillator element will enter and remain within a sensor element, thereby providing spatial resolution. In one embodiment, the sensor 120 includes a 64×576 array of pixels, although the present invention is not so limited.

Figure 2:
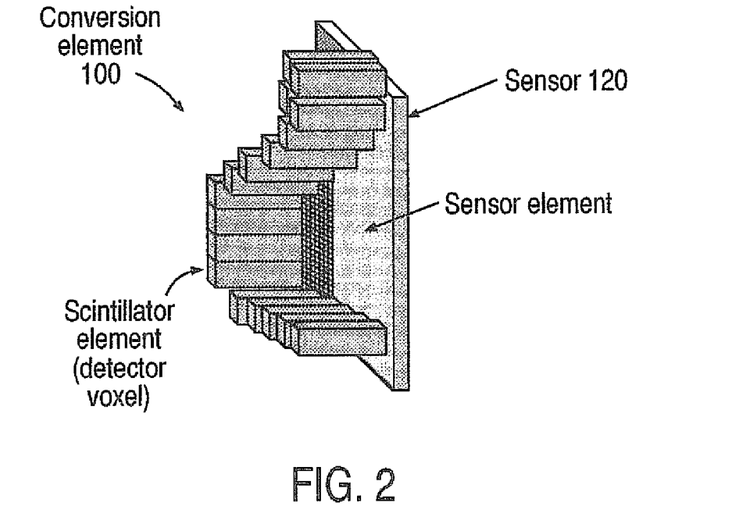

FIG. 2 represents another view of the conversion element 100 but with some scintillator elements removed. As shown in FIG. 2, there is not necessarily a one-to-one correspondence between the pixilated scintillator elements and the pixilated sensor elements. In one embodiment, the scintillator elements are larger than the sensor elements; in effect, multiple sensor elements are associated with each scintillator element. In one such embodiment, each scintillator element (detector voxel) is approximately two (2) millimeters (mm) in length (L), 2 mm in width (W), and four (4) mm in depth (D); each sensor element measures approximately 0.52 mm by 0.52 mm (L×W); and the conversion element 100 measures approximately 30 centimeters (cm) by 33 mm (L×W). In general, the conversion element is much longer than it is wide. Embodiments according to the invention are not limited to these dimensions. The sensor 120 can utilize larger but fewer pixels, or larger arrays of pixels, or a combination of larger pixels and larger arrays, for example. Also, non-rectangular detector voxel designs can be used.

A photodiode associated with each pixel of the sensor 120 accumulates the charges generated from light by absorption of the radiation beam in the scintillator 110. The TFTs in the sensor 120 are energized (switched on or closed) to permit the accumulated charges to flow as electrical signals to processing circuitry. In one embodiment, multiple lines (rows) of sensor elements are sampled at the same time. In one such embodiment, 4 lines are simultaneously sampled. Thus, data can be acquired quickly.

Figure 3:
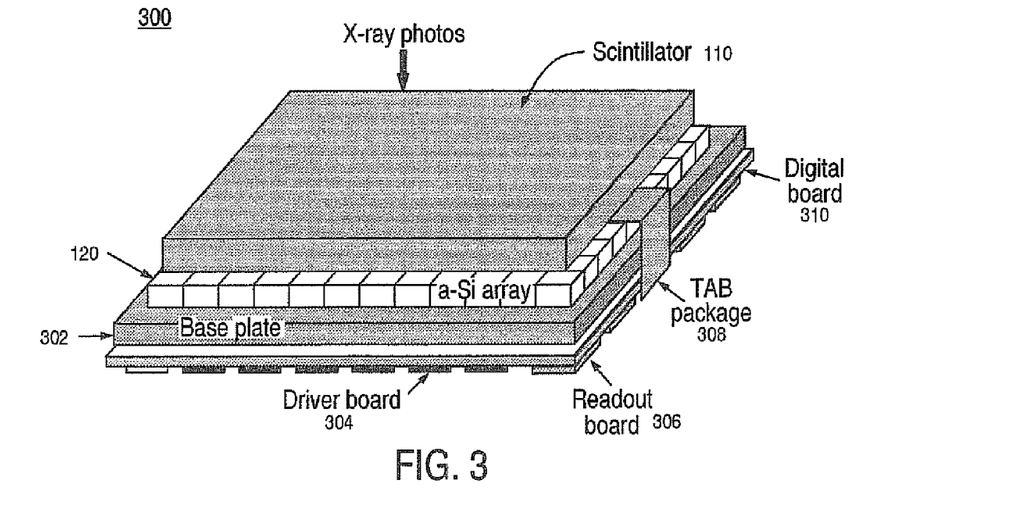

FIG. 3 illustrates certain elements of a radiation detector 300 according to an embodiment of the invention. In addition to the scintillator 110 and sensor 120 already discussed, detector 300 can include a base plate 302 and various circuit boards (e.g., a driver board 304, a readout board 306, and a digital board 310). In general, the base plate 302 is used to protect the underlying electronics against radiation damage. The driver board 304 is used to selectively energize the TFTs in the sensor 120 in order to sample the sensor elements as discussed above. The electrical signals generated by the sensor 120 are connected to the readout board 306 by means of a tape automated bonding (TAB) package 308. The digital board 310 converts the electrical signals into digital data by means of an analog-to-digital converter, for example. The digital data, in turn, can be processed by a computer or similar type of device (see FIG. 5).

With reference back to FIG. 1, data about the radiation beam can be used to characterize the object under investigation. In operation, a radiation source (e.g., an x-ray tube) sends a beam (e.g., x-ray photons) through a target object, such as a cargo container or a truck trailer. X-rays not absorbed by the object strike the scintillator 110, which converts the x-rays into light photons. The light photons, in turn, strike the photodiodes in the sensor 120, which accumulate charges that are converted into electrical signals as previously described herein. The electrical signals can be processed by a computer and converted into a high-quality image of the target object.

The scintillator 110 and the sensor 120 can be operated in different orientations relative to the incident radiation beam. Specifically, the conversion element (e.g., the combination of scintillator and sensor) can be used in an orientation that is normal to or substantially normal to the radiation beam, or in an orientation that is transverse to or substantially transverse to the radiation beam, or in an orientation that is between these two extremes (e.g., at a 45-degree angle relative to the beam). The terms "substantially normal to" and "substantially transverse to" are used herein to signify that the detector can still properly function even with some deviation from the true (precise) normal direction or true transverse direction. For example, even if the conversion element is not precisely normal to an incident beam, the detector can still be used in the counting and integrating modes described below; and even if the conversion element is not precisely transverse to an incident beam, the detector can still be used in the counting and integrating modes and to measure the beam's energy spectrum, as described below. Thus, the use of "substantially" implies that any deviation from true normal or true transverse is within the amount that permits the detector to adequately serve its purpose(s).

Accordingly, the detector can be used in different data collection modes. For example, the detector can be used in an integrating mode or in a counting mode. In the integrating mode, the energy absorbed by each pixel in the sensor 120 as a function of time can be determined—each pixel measurement is the result of the sum of many radiation events within an object voxel over an interval of time. In the counting mode, the number of x-ray photons detected by each pixel in the sensor 120 as a function of time can be counted—each pixel measurement represents a count of each single interaction between the radiation beam and an object voxel over an interval of time. The length of each interval of time corresponds to the frame rate of the sensor 120. In one embodiment, the sensor frame rate is at least 1000 frames per second, allowing counting rates of up to about 1000 events per second-pixel.

Figure 4:
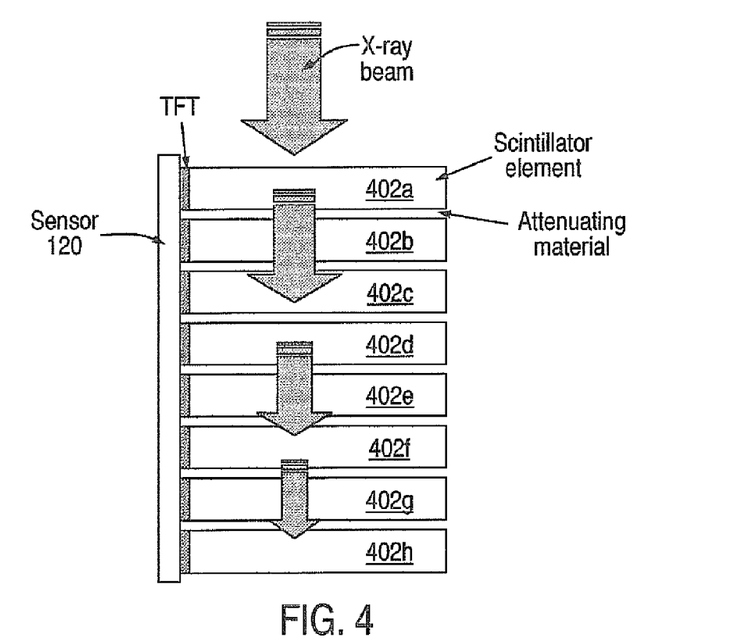
FIG. 4 illustrates the energy resolving capability of a radiation detector according to an embodiment of the invention.

In the transverse orientation, it is also possible to measure the energy spectrum of the radiation beam. FIG. 4 is used to illustrate the energy resolving capability of a radiation detector according to an embodiment of the invention. In the example of FIG. 4, an x-ray beam enters the scintillator elements 402a-402h in the transverse direction, and is attenuated as it travels through successive blocks. Attenuating material, such as lead or tungsten, can be placed between neighboring scintillator elements to provide additional attenuation. Higher-energy x-ray photons will penetrate through more of the scintillator elements than will lower-energy x-ray photons; thus, a higher-energy x-ray photon will result in a reading from more scintillator elements and hence from more sensor elements. By evaluating the number of counts associated with each of the scintillator elements, the energy distribution of the incident radiation beam can be estimated.

Figure 5:
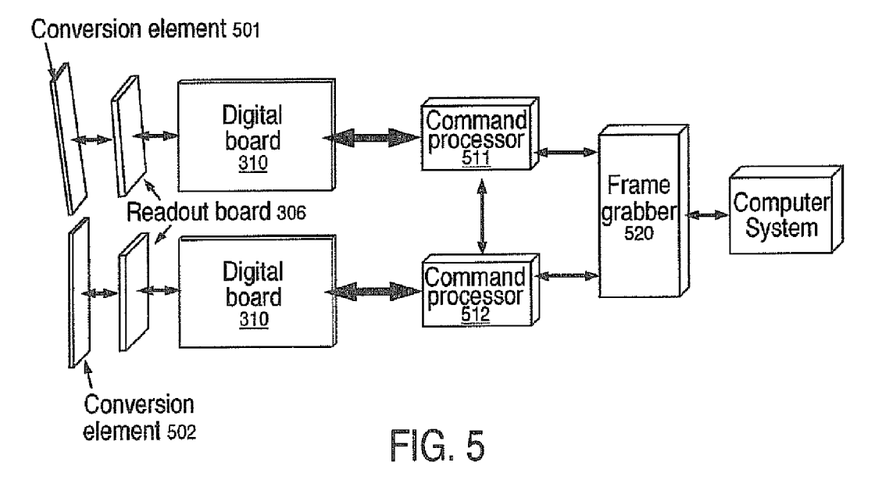
FIG. 5 is a block diagram showing elements of a radiation detection system according to an embodiment of the invention.

FIG. 5 is a block diagram showing elements of a radiation detection system 500 according to an embodiment of the invention. In particular, FIG. 5 illustrates how multiple conversion elements 501 and 502 can be arranged adjacent to one another in a multi-detector architecture. The conversion elements 501 and 502 are, in general, examples of the conversion element 100 of FIG. 1.

In the example of FIG. 5, the conversion elements 501 and 502 slightly overlap one another. Also, in the example of FIG. 5, the conversion elements 501 and 502 are positioned at an angle relative to one another. Alternatively, the conversion elements can be positioned within the same plane or parallel to one another, and/or the conversion elements can be positioned immediately adjacent to one another (e.g., edge-to-edge), as shown in FIG. 6.

Figure 6:
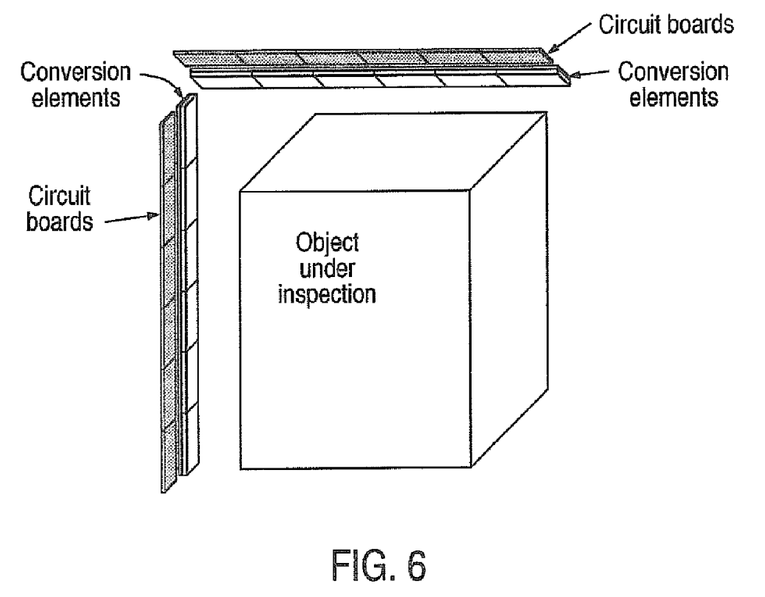
FIGS. 6, 7, 8, 9, and 10 illustrate examples of a radiation detector in use according to embodiments of the invention.

In the examples of FIGS. 5 and 6, each of the conversion elements 501 and 502 is coupled to a respective readout board and digital board, which are coupled to the command processors 511 and 512, respectively. The command processors are coupled to a frame grabber 520, which may be coupled to a computer system. Accordingly, signals generated by the conversion elements can be accumulated frame-by-frame and then analyzed to produce a high quality image of an object being investigated.

The readouts and data from each of the conversion elements 501 and 502 can be synchronized and processed so that, in a sense, the multiple smaller conversion elements function as a single larger element. In this manner, conversion elements can be used as building blocks to form larger detectors, as shown in FIGS. 5 and 6. As such, there are many applications that can benefit from the types of detectors described herein. For example, applications in fields with unique measurement and inspection requirements—especially, inspections of the contents of larger objects such as truck trailers and air and sea cargo containers, but also quality assurance inspections of relatively solid and large objects such as engine blocks, transmissions, and rockets—can benefit from the increased acquisition speed and energy sensitivity offered by the detectors described herein.

Figure 7:
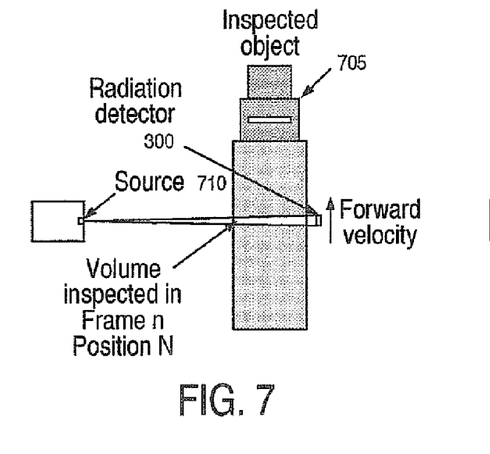
Figure 8:
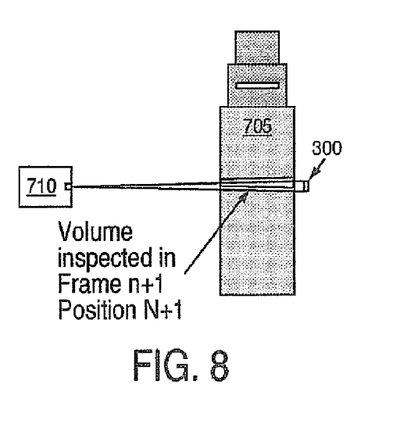

FIGS. 7 and 8 are examples of a radiation detector in use according to embodiments of the invention. A top-down view of an object 705 under inspection (e.g., a truck's trailer) is illustrated. As noted above, the radiation detector 300 can be used in different orientations and in different modes in each orientation. The modes include, for example, an integrating mode and a counting mode. The orientations include, for example, an orientation that is normal to an incident radiation beam emitted by the source 710, an orientation that is transverse to such a radiation beam, or an orientation that is between normal and transverse.

In the integrating mode and normal orientation, a beam from the radiation source 710 will pass through the object to the radiation detector 300. A single pulse of radiation from the source 710 exposes a strip of the object 705. The pulse (or beam) is essentially fan-shaped so that it extends the length of the detector (see FIG. 9, for example). With the object 705 in position N, an entire frame n of data can be read from the detector 300.

Continuing with reference to FIGS. 7 and 8, the relative speed between the object 705 and the detector 300 (e.g., the forward velocity of the object 705 relative to a stationary detector) can be established such that rays from the source to the detector shift an integer number of detector pixels (e.g., scintillator elements 110 of FIG. 1) between each frame. To obtain more information about each object voxel, the speed of the object 705 can be established such that each frame overlaps the preceding frame at least to some extent. In general, the information collected about the object 705 depends on: the number of detector pixels along the direction of motion; the object's velocity; the scan geometry; and the pulse rate of the source 710.

In the counting mode and normal orientation, the event rate per detector voxel is ideally less than the frame rate. In the counting mode, many of the sensor elements 120 (FIG. 1) will read near zero (they will likely not read exactly zero because of intrinsic electronic noise). A value near zero means that the corresponding scintillator element 110 did not experience an incident particle/photon with energy sufficient to produce a detectable signal; this implies that the detector 300 is dependent on the energy spectrum of the incident beam. A sensor element 120 that does not read near zero represents one event. The magnitude of the reading can also be used to characterize the detected particle/photon type or energy.

In the normal orientation, in either the integrating mode or the counting mode, the detector 300 can also be operated with only a portion (e.g., a very small portion) of the conversion element 100 exposed, with the remainder of the conversion element array heavily collimated. Interactions in the exposed scintillator elements may move into neighboring pixels. This can be used to gather information about the energy distribution of the incident beam. In the counting mode, if the event rate is low enough, then collimation may not be needed.

As mentioned above in conjunction with FIG. 4, in the transverse orientation, the incident beam can be detected along one or more scintillator elements/sensor pixels, depending on the energy of the beam. The electronic signals produced by the sensor array will depend on, and thus can be used to measure, the energy spectrum of the incident beam. The energy spectrum will be a function of both the source 710 and the line integral of the object voxels.

In the transverse orientation, the integrating and counting modes perform measurements much like in the normal orientation. Furthermore, the change in magnitude of the energy reading from pixel-to-pixel (scintillator element-to-scintillator element) along the beam path can be used to obtain information about the characteristics of the beam. In general, an x-ray photon spectrum is a continuous-varying function of photon energy and number. As the photons pass through material, various interactions can occur. The probability of an interaction, and thus a measurement or signal, depends on the energy. This implies that the energy spectrum is changing along the beam path.

Figure 9:
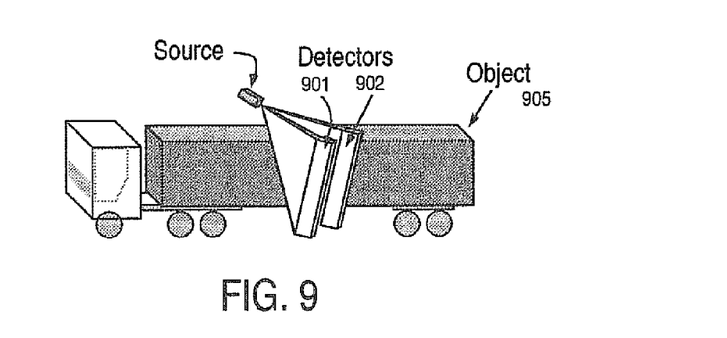
Figure 10:
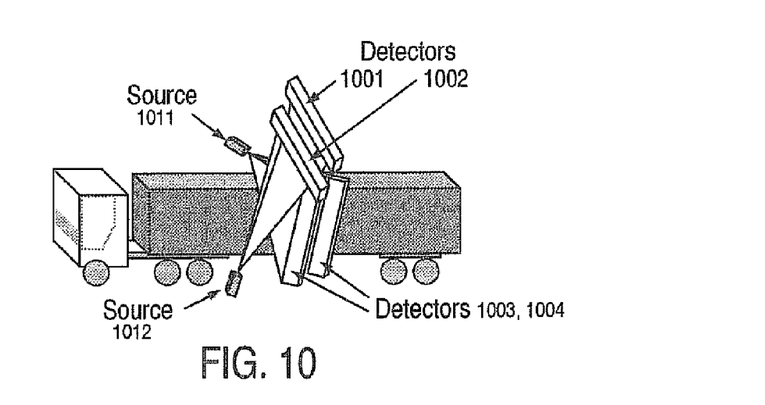

FIGS. 9 and 10 show examples of radiation detectors in use according to embodiments of the invention. In the example of FIG. 9, multiple detectors 901 and 902 are used to scan an object 905 (e.g., a truck's trailer) as described above in conjunction with FIGS. 6-8. In the example of FIG. 10, multiple detectors 1001, 1002, 1003 and 1004 are used in combination with multiple radiation sources 1011 and 1012 to further increase the range and speed of inspections.

Figure 11:
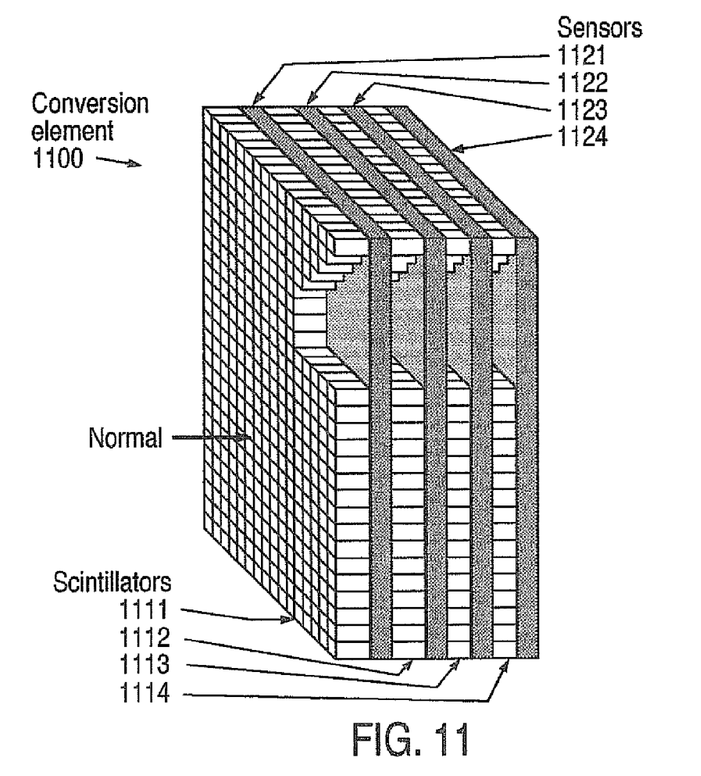
FIG. 11 illustrates an arrangement of elements in a compound radiation detector according to an embodiment of the invention.

FIG. 11 illustrates an arrangement of elements in a compound radiation detector according to an embodiment of the invention. In particular, FIG. 11 illustrates an embodiment of a conversion element 1100 that includes multiple conversion layers (scintillators) 1111, 1112, 1113 and 1114, and multiple sensors 1121, 1122, 1123 and 1124. While eight layers are illustrated, the present invention is not so limited.

With reference also to FIG. 1, the scintillators 1111-1114 are, in general, examples of the scintillator 110, and the sensors 1121-1125 are, in general, examples of the sensor 120. In the FIG. 11 embodiment, the scintillators and sensors are arranged in an alternating fashion. That is, for example, the sensor 1121 is disposed between the scintillator 1111 and the scintillator 1112, and the scintillator 1112 is disposed between the sensor 1121 and the sensor 1122.

In general, the different schemes (e.g., integrating and counting modes) described above can also be used with the conversion element 1100. However, the schemes previously described herein as being performed in the transverse orientation can now be performed in the normal orientation using the conversion element 1100. However, depending on the design of the readout board, those schemes can still be performed in the transverse orientation using the conversion element 1100.

The compound configuration of FIG. 11 has a number of benefits related to improved x-ray photon energy sensitivity and quantum detection efficiency. These in turn permit the compound configuration to have improved spectrum detection sensitivity and reduced fundamental (Swank) noise. The improvement in spectrum detection sensitivity is the result of having multiple detection layers sensing spectrum properties in each detector voxel along beam paths. The improvement in quantum detection efficiency is also the result of multiple layers that increase the efficiency and uniformity of sensing identical signals for single photon events occurring within a detector voxel.

The compound configuration of FIG. 11 also introduces a new scheme: dynamic electronic two-dimensional focusing for a normal incident beam. The data collected in a single frame can be numerically analyzed to yield an images focusing on any arbitrarily located beam source point. This can be accomplished because, once a source point for the beam has been defined, rays emanating from that point and passing through a detector voxel in the first layer of the conversion element 1100 also pass uniquely through detector voxels in succeeding layers. An image from a detector focusing on the defined source point can be constructed from the raw frame data for each layer of the conversion element 1100 by appropriately shifting and adding. In the analytical process, appropriate mathematical methods can be used to process and filter the raw frame data to achieve the resolution and contrast permitted by the bandwidth of the data. This bandwidth is largely determined by the dimensions of the detector voxels and their quantum detection efficiency. A single frame of data from the conversion element 1100 can be used to produce images focusing on the location of the beam source.

Figure 12:
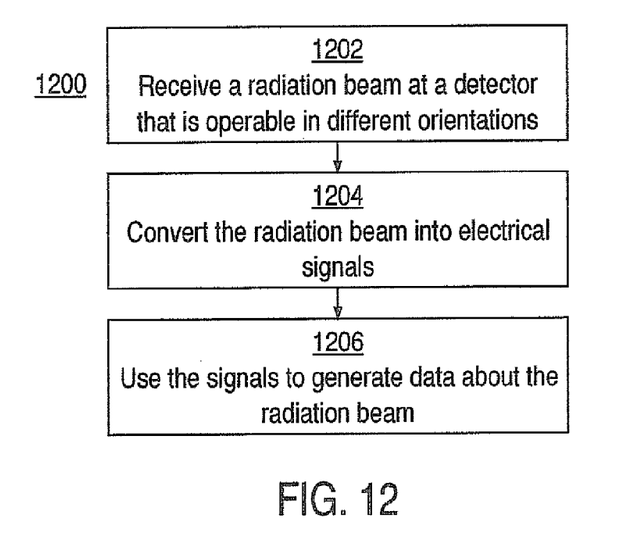
FIG. 12 is a flowchart of a method of using a radiation detector according to an embodiment of the invention.

FIG. 12 is a flowchart 1200 of a method of using a radiation detector according to an embodiment of the invention. Although specific steps are disclosed in the flowchart 1200, such steps are exemplary. That is, the present invention is well-suited to performing various other steps or variations of the steps recited in the flowchart 1200. In one embodiment, the method of the flowchart 1200 is performed by, for example, the system 500 of FIG. 5.

In block 1202 of FIG. 12, a radiation beam is received at a radiation detector. The radiation detector is operable in multiple orientations relative to a radiation source and relative to an object being scanned. Those orientations include at least a first orientation and a second orientation. In the first orientation, a panel (e.g., a conversion element) is normal to the radiation beam, and in the second orientation, the panel is transverse to the radiation beam.

In block 1204, the radiation beam is converted into electrical signals. In block 1206, the signals are used to generate data about the radiation beam. Because the radiation detector can be operated in different orientations, a single system can be used in different data collection modes. Those modes include an integrating mode and a counting mode. Also, the energy spectrum of the radiation beam can be measured.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of scanning an object using radiation, said method comprising:
   with a radiation detector operating in a first orientation, receiving a radiation beam at said radiation detector, wherein said radiation detector comprises a first panel that is substantially normal to said radiation beam in said first orientation;
   with said radiation detector operating in a second orientation, receiving said radiation beam at said radiation detector, wherein said first panel is substantially transverse to said radiation beam in said second orientation;
   converting said radiation beam received by said radiation detector into electrical signals; and
   using said electrical signals to generate data about said radiation beam.

2. The method of claim 1, wherein said first panel comprises:
   a first scintillator configured to emit light in response to said radiation beam, said first scintillator comprising a single layer first array of scintillator elements; and
   a first sensor coupled to said first scintillator and configured to receive light from said first scintillator and to generate a first plurality of said electrical signals in response thereto.

3. The method of claim 2, wherein said radiation detector further comprises:
   a second scintillator configured to emit light in response to radiation, said second scintillator comprising a single layer second array of scintillator elements that is parallel to said first array; and
   a second sensor coupled to said second scintillator and configured to receive light from said second scintillator and to generate a second plurality of said electrical signals in response thereto, wherein said first and second scintillators and said first and second sensors are used concurrently during said scanning.

4. The method of claim 3, wherein said first panel comprises said first sensor disposed between said first scintillator and said second scintillator, and said second scintillator disposed between said first sensor and said second sensor.

5. The method of claim 4, further comprising focusing said radiation detector on a location of said radiation source using said first and second pluralities of said signals.

6. The method of claim 1, wherein said first panel comprises rows of scintillator material capable of generating light in response to said radiation beam, said rows separated by attenuating material capable of attenuating said radiation beam.

7. The method of claim 1, wherein said radiation detector further comprises a second panel that is adjacent to said first panel.

* * * * *